United States Patent [19]

Bergman et al.

[11] Patent Number: 5,609,485
[45] Date of Patent: Mar. 11, 1997

[54] MEDICAL REPRODUCTION SYSTEM

[75] Inventors: Mark Bergman; Dror Aiger; Dan Levit; Ron Tepper, all of Kfar-Sava, Israel

[73] Assignee: MedSim, Ltd., Israel

[21] Appl. No.: 316,841

[22] Filed: Oct. 3, 1994

[51] Int. Cl.$^6$ .................................................. G09B 9/00
[52] U.S. Cl. .................... 434/262; 434/267; 434/274; 601/2; 128/660.01
[58] Field of Search ........................................ 434/262, 266, 434/267, 274; 364/413.28, 413.01, 413.02; 128/653.1, 660.01, 630; 601/2, 3

[56] References Cited

U.S. PATENT DOCUMENTS

| | | |
|---|---|---|
| 3,983,474 | 9/1976 | Kuipers . |
| 4,017,858 | 4/1977 | Kuipers . |
| 4,054,881 | 10/1977 | Raab . |
| 4,298,874 | 11/1981 | Kuipers . |
| 4,314,251 | 2/1982 | Raab . |
| 4,328,548 | 5/1982 | Crow et al. . |
| 4,346,384 | 8/1982 | Raab . |
| 4,613,866 | 9/1986 | Blood . |
| 4,688,037 | 8/1987 | Krieg . |
| 4,737,794 | 4/1988 | Jones . |
| 4,742,356 | 5/1988 | Kuipers . |
| 5,061,187 | 10/1991 | Jerath ................................. 434/262 |
| 5,275,572 | 1/1994 | Ungs et al. ....................... 434/262 X |
| 5,343,391 | 8/1994 | Mushabac ......................... 364/413.28 |

OTHER PUBLICATIONS

Thomas R. Nelson, et al., "Visualization of 3D Ultrasound Data", IEEE Computer Graphics & Applications, Nov. (1993), pp. 50–57.

Primary Examiner—Jerome Donnelly
Assistant Examiner—Glenn E. Richman
Attorney, Agent, or Firm—Finnegan, Henderson, Farabow, Garrett & Dunner, L.L.P.

[57] ABSTRACT

The medical reproduction system is a computer-based interactive reproduction system device designed to be used by physicians and technicians in medical training and diagnosis using medical systems such as ultrasound machines. Biological data is collected from a living body and stored in memory. An operator manipulates a simulated sensor over a transmitter which may be attached to a simulated body. The transmitter transmits position data to a receiver in the sensor. The reproduction unit processes the preset biological data and displays data corresponding to the position of the sensor with respect to the transmitter.

15 Claims, 12 Drawing Sheets

FIG. 10
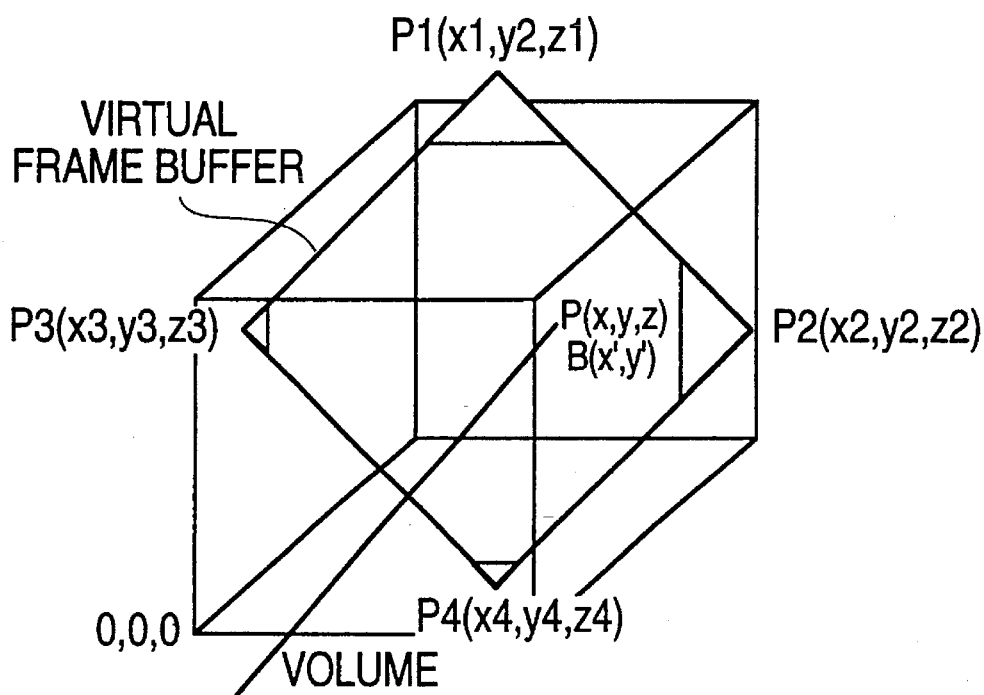
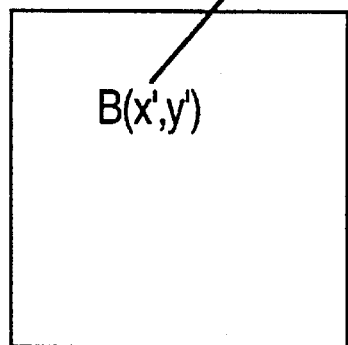
THE PIXEL IN THE FRAME BUFFER AT x',y' GETS THE VALUE OF THE VOXEL AT x,y,z WHICH IS THE 3D COORDINATE OF THE PIXEL IN THE VIRTUAL BUFFER.

MEDICAL REPRODUCTION SYSTEM

BACKGROUND OF THE INVENTION

1. Field of the Invention

The present invention relates to an apparatus and method of reproducing a medical examination by medical personnel working with complex diagnostic machines requiring proficient eye-hand coordination. More specifically, the invention relates to a reproduction system for use by medical physicians and technicians operating complex medical machinery, such as those used in ultrasound examinations, laparoscopy, hysteroscopy, and colonoscopy, on a wide range of organs and pathologies. The reproduction can be used as a diagnostic tool or as a simulator for training purposes.

2. Description of the Related Art

The use of simulators is known in certain fields. For example, flight simulators are used to train pilots to handle multiple flight situations without the risk or expense of putting a trainee in an actual airplane.

Medical reproduction systems are currently being explored in the areas of training and performing diagnoses. One area of medical technology which can benefit from use of a suitable reproduction system is ultrasound examination.

An ultrasound examination consists of moving a hand-held probe containing a transducer, which is transmitting and receiving ultrasound waves, across a portion of or in a patient's body. Typically, an ultrasound machine operator scans a 3-dimensional (3D) human organ with a probe, and the ultrasound machine displays 2-dimensional (2D) pictures of a portion of the examined organ according to the position and angle of the transducer in the probe with respect to the examined organ. The 2D picture is then interpreted by the operator. The operator must combine hand-eye coordination with knowledge of human anatomy to find the best probe position and angle, in order to display the most optimal picture for interpretation. Once the optimum picture is found, the examiner can proceed to evaluate, compare and measure the data displayed and then determine a diagnosis of the case. Adjustment of ultrasound settings, questioning the patient and inquiring after additional data (such as previous examination results) also assists the examiner in determining the diagnosis.

Ultrasound training is performed currently using several methods. One traditional training method is for an operator/trainee to use an actual ultrasound machine on other individuals, such as fellow students or actual patients. The main disadvantage of this method is the shortage of available patients and the inability to view predetermined pathologies. Patients with specific pathologies appear randomly. Depending on the rarity of the pathology, it can take some time before a trainee actually encounters a specific pathology during training.

Another traditional training method involves using an actual ultrasound machine on "phantoms". Phantoms are physical devices containing substances which produce images in response to ultrasound waves. With this method, the trainee can see the 2D ultrasound display and practice interpreting the observed picture, using previous knowledge of the geometrical shapes in the phantom.

Other traditional training methods display the results of pre-recorded scans via video, textbook or computer media, for interpretation by the trainee.

None of the aforementioned traditional training methods provide any training in the dynamic use of ultrasound on a simulated patient, having any one of a number of desired training pathologies. Moreover, no traditional method allows real-time change of ultrasound settings, selection of the correct transducer, selection of desired pathologies, or practice in hand-eye coordination with the probe, required to obtain the optimal picture.

Similar shortcomings exist in traditional methods for diagnosing pathologies. Existing systems do not enable a physician to conduct an independent examination at a location that is remote from the actual patient.

A reproduction system is required which will allow:

a) actual hand-eye coordination involving manipulation of a probe on a simulated patient;

b) real-time training in finding pathologies in a simulated patient while utilizing a plurality of ultrasound functions;

c) selection of various training pathologies; and d) real-time diagnostic capability at a location remote from an actual patient.

Additional objects and advantages of the invention will be set forth in the description which follows, and in part will be may be realized by practice of the invention. The objects and advantages of the invention may be obtained by practicing the combinations set forth in the claims.

SUMMARY OF THE INVENTION

To achieve the foregoing objects and in accordance with the purposes of the invention as embodied and broadly described herein, a medical reproduction system is provided. The medical reproduction system and associated memory unit presents biological display data gathered from a living body. A simulated body may also be provided. A sensor contained in a hand-held probe is operable to detect position data in relation to the position of the sensor with respect to a transmitter. If a simulated body is provided, the transmitter is provided in or on the simulated body. A processor determines a portion of the stored biological display data reproducing an examination of a real case corresponding to the position data detected by the sensor. A display unit is provided, operable to display an output based on the portion of the biological display data determined by the processor.

As broadly embodied herein, the medical reproduction system is an ultrasound reproduction system.

As broadly embodied herein, the present invention provides real time reproduction of ultrasound images on a mannequin. An ultrasound reproduction system, according to the invention, simulates the hardware of an actual ultrasound machine, including a probe, a display apparatus, and requisite controls. The reproduced examination includes all stages usually followed during an actual ultrasound evaluation, including identifying the anatomic sections, evaluating patient history, manipulating the probe, selecting displays, image analysis and diagnosis.

The ultrasound reproduction system is interactive in real-time, providing the opportunity to explore the anatomy as if an actual patient were present. There is no limited perspective or view (as in video or computer based systems). The operator can practice performing ultrasound examinations in conditions very similar to real life, practicing the hand-eye coordination technique used during a real ultrasound examination.

In addition to interactivity, the ultrasound reproduction system will provide a large library of cases (including rare pathologies), which can be taught during a relatively short period of time according to a schedule established by the user or by an instructor.

As broadly embodied herein, the invention when used with a simulated body is ideally used for training purposes. However, the invention also can be used for diagnostic purposes by a trained operator. In the diagnostic environment, a transmitter is required, but a simulated body is not required.

The present invention combines didactic instruction with exploratory learning via trial and error. Specific lesson plans can be prepared periodically with new material allowing for the creation of a large encyclopedia of lessons.

Reproduction modules included with the present invention provide all standard ultrasound functions, such as B mode, doppler, color doppler, M mode, gains, annotations, body marks, print and record, caliper and measurement, freeze, cinemode, ultrasound mode selection, audio volume, acoustic power, image direction, magnification, zoom, and image focus. It is further preferred that the invention include advanced ultrasound functions such as color doppler.

Training and educational modules combined with the reproduction modules create an interactive system. The present invention provides interactive audio and visual display feedback to the trainee based on the trainee's performance and the context of the examination. Preferably, two main learning modes are available: tutorial and demonstration mode, and dynamic training (exploratory) mode.

The tutorial and demonstration mode is used to teach how an ultrasound machine functions, and for specific anatomic lessons. This mode provides a step-by-step tutorial of a specific lesson combined with a demonstration of a pre-programmed scan along with explanations describing the procedure and emphasizing important points.

In the dynamic training mode the trainee practices the scanning procedure. The trainee can scan from many angles, operate the simulated ultrasound functions and perform the procedures required during an actual ultrasound examination. This mode combines elements of deductive learning with demonstrative learning in a highly interactive visual and audio format. The present invention correlates information regarding the symptoms, patient history, or similar cases with the actual ultrasound examination performed by the trainee.

As broadly embodied herein, the invention consists of two parts:

1) Data Gathering Unit—Ultrasound data is collected from patients via a standard ultrasound machine connected to a special Data Reception Unit (DRU) enabling computation and storage of the data. The Data Reception Unit (DRU) processes the data and stores it as a volume of ultrasound data.

2) Reproduction Unit—The reproduction unit consists of a mock-up ultrasound system, a mock-up sensor or transducer, and a transmitter which, when used for training, is included in a mock-up patient. The system measures the position and angle of the mock-up transducer with respect to the transmitter via a sensor installed in the mock-up transducer. It then displays in real-time the ultrasound image which was acquired via the DRU and which correlates to the position and angle of the mock-up transducer with respect to the transmitter.

The ultrasound data undergoes another level of processing to provide simulated ultrasound functions such as gain control, focus, and body movement.

The reproduction unit also provides background data on a simulated patient, such as patient history, patient medical information and diagnostic data. To supplement learning, the system will provide the trainee with an option to view an ultrasound scan of a pathology as it was performed by an expert. This is referred to as the Expert Scan. This feature will provide the trainee with a reference for comparison with his own scan.

The reproduction unit may also provide a probe orientation display for assisting the operator in properly orienting the hand-held probe. The probe orientation display can take the form of a three dimensional image of the simulated patient with a representation of the part of the simulated patient being scanned, or any other graphical representation that will assist the operator in properly orienting the hand-held probe.

Preferably, an extensive number of lessons are available, depending on the number of pathologies collected and prepared with the Data Reception Unit, and on the topics requiring training.

BRIEF DESCRIPTION OF THE DRAWINGS

The accompanying drawings, which are incorporated and constitute a part of the specification, illustrate a preferred embodiment of the invention and, together with the general description given above and the detailed description of the preferred embodiment given below, serve to explain the principles of the invention.

FIG. 10 graphically depicts presentation of a 3D voxel on a 2D display screen in accordance with the invention;

DETAILED DESCRIPTION OF THE PREFERRED EMBODIMENTS

Figure 1:
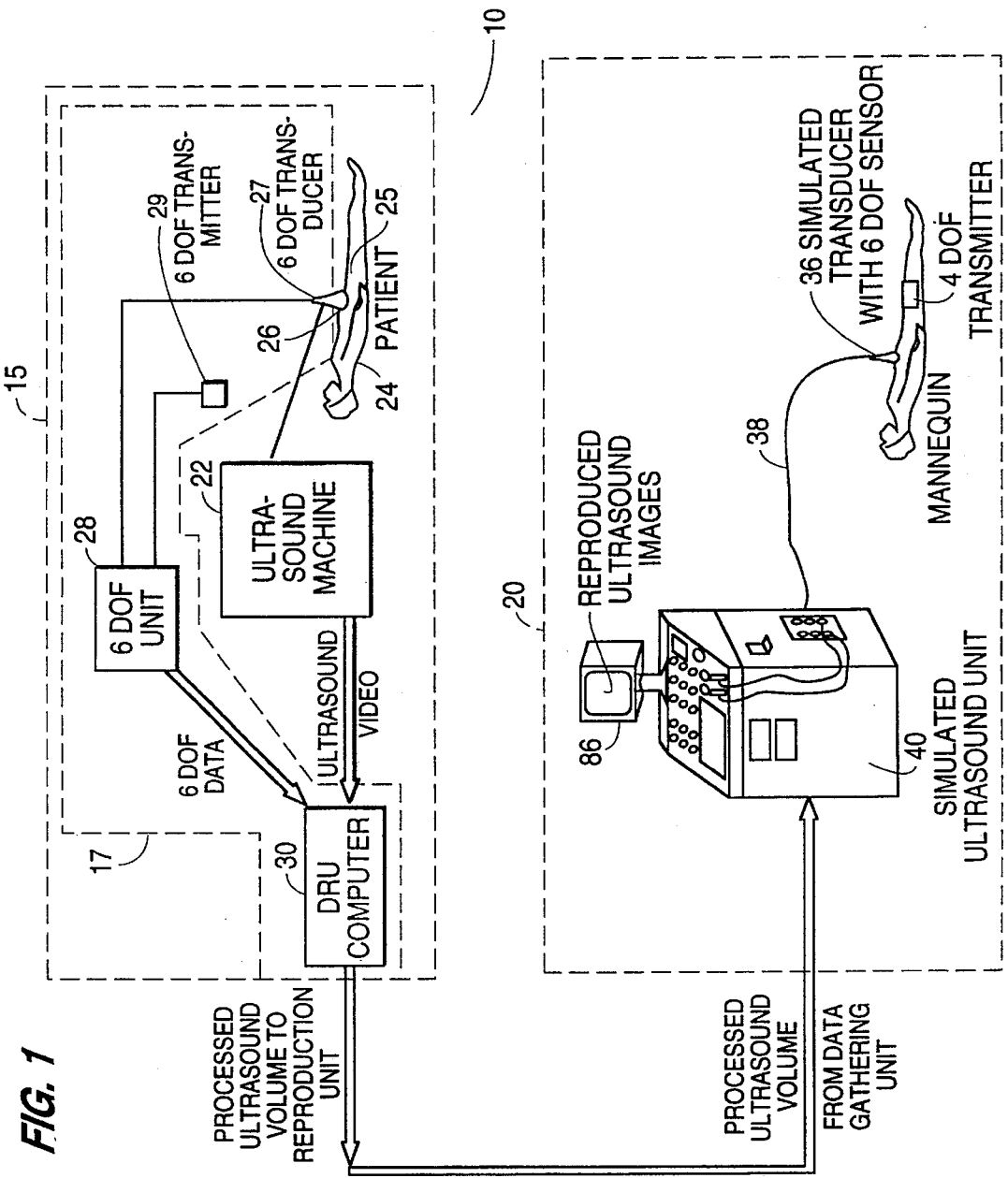
FIG. 1 is a schematic layout and partial block diagram of an ultrasound reproduction system in accordance with the invention, including a data gathering unit and a reproduction unit.

Reference will now be made in detail to the present preferred embodiment of the invention as broadly illustrated in the accompanying drawings.

In accordance with the invention, a medical reproduction system is provided, which may be, for example, an ultrasound reproduction system. As broadly depicted in FIG. 1 an ultrasound reproduction system is designated generally by reference numeral 10, and includes a data gathering unit 15 and a reproduction unit 20. The data gathering unit 15 includes a data reception unit (hereinafter abbreviated as "DRU") 17, an ultrasound machine 22, and a transducer 26.

In accordance with the invention, a memory unit stores biological display data gathered from a living body. As broadly depicted in FIG. 1, an ultrasound machine 22, which may be any of the numerous ultrasound machines that are well known in the art, is used to collect biological data from a living patient. The operator (not shown) scans a living body 24 with an ultrasound probe 26. The probe 26 contains a transducer 25, as is well known in the art, capable of transmitting an ultrasonic pulse and receiving return echoes. It will be understood that in an actual ultrasound examination, the probe 26 enjoys six degrees of freedom (hereinafter abbreviated as "6 DOF"), i.e., motion in the X-axis, Y-axis, Z-axis, pitch, roll, and yaw. To measure the six degrees of freedom, a 6 DOF receiver 27 is connected to the ultrasound probe for detecting signals transmitted from a 6 DOF transmitter 29.

The biological data collected during the examination is processed by the ultrasound machine 22, while the data relating to the position of the ultrasound probe 26 is processed by a 6 DOF unit 28. The video data processed by the ultrasound machine 22 based on the biological ultrasound data, along with corresponding 6 DOF data from the examination of the patient, are transferred to a DRU computer 30 for processing.

DRUs suitable for use with the invention are well known in the art. One suitable DRU is disclosed in Nelson et al., "Visualization of 3D Ultrasound Data", *IEEE Computer Graphics and Applications*, November 1993, p. 50 et seq., which is incorporated herein by reference. However, a preferred DRU is shown in FIGS. 2 and 3 and described below.

The main purpose of the DRU 17 is to collect and generate the volume of voxels which will be used by the simulated ultrasound unit 40. The DRU 17 handles the following tasks: data collection, alignment, volume positioning, data verification, and recording.

Figure 2:
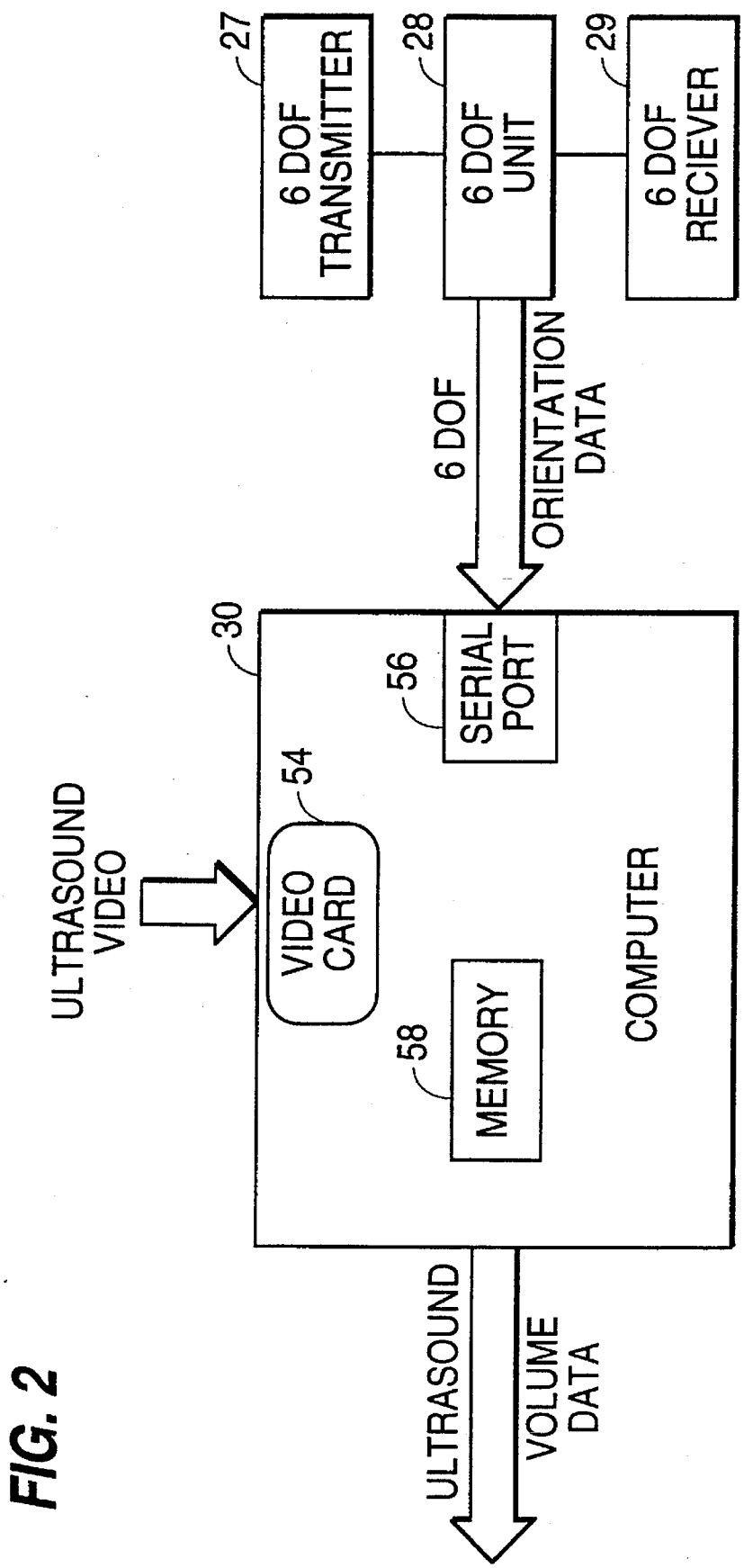
FIG. 2 is a general block diagram of part of the hardware elements of a Data Reception Unit (DRU) portion in accordance with the invention.

As broadly shown in FIG. 2, a preferred embodiment of the DRU computer 30 includes a video card 54, a serial port 56, and a memory 58. It accepts as inputs the ultrasound video data from the ultrasound machine 22 and the 6 DOF data from the 6 DOF unit 28. The DRU computer 30 operates based on DRU software contained in the memory 58.

Figure 3:
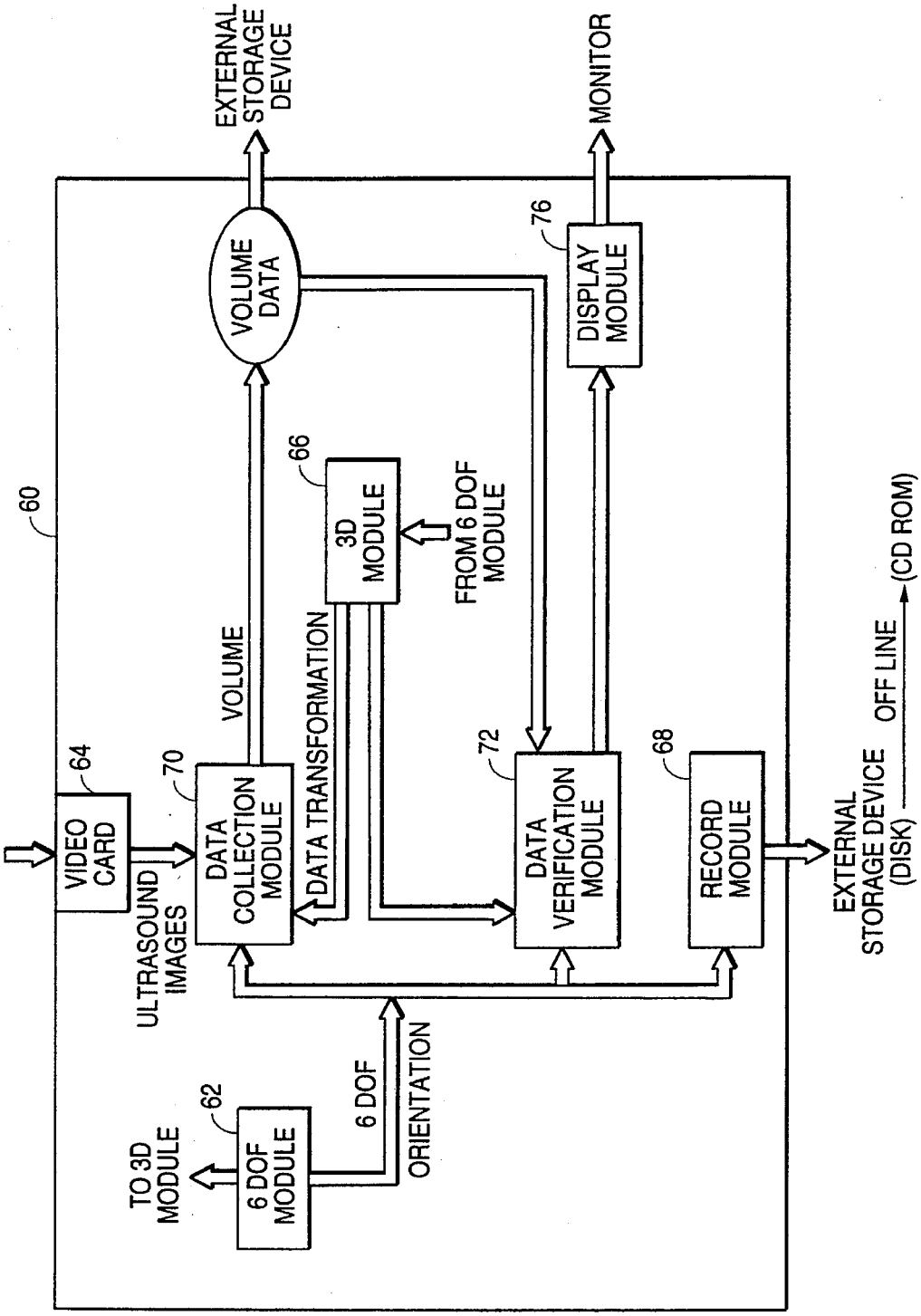
FIG. 3 is a general block diagram of the DRU software elements in accordance with the invention.

As broadly shown in FIG. 3, a preferred embodiment of the DRU software 60 includes such modules as a 6 DOF module 62, a video card module 64, a 3D module 66, a recording module 68, a data collection module 70, a data verification module 72, and a display module 76.

The preferred functions of the DRU computer 30 and the DRU software 60 will be described below with reference to FIGS. 2 and 3.

In the DRU software 60, the 6 DOF module 62 is responsible for initializing the serial port 56 and for receiving the 6 DOF data from the 6 DOF unit 28. The 6 DOF data is used in the alignment, volume positioning, data collection, data verification, and recording tasks. The 6 DOF module 62 performs read and write functions from and to the 6 DOF hardware via the serial port 56 in the DRU 30. These read and write functions are used by other modules in the DRU software 60 in order to interface with the DRU hardware. The 6 DOF module 62 outputs data indicating the 6 DOF orientation of the 6 DOF sensor 26 as well as other data it receives from the 6 DOF unit 28.

The video card module 64 is responsible for handling the ultrasound video data received from the ultrasound machine 22 and forwarding it to the data collection module 70. The video card module 64 sends commands and receives status from the video card hardware 54, and outputs display window data for inclusion in the volume data.

The 3D module 66 is responsible for the transformation used to manipulate the 6 DOF orientation data. This module enables the user to define a new reference frame coordinate system to which all coordinates and Euler angles will be referred. This enables the system to "work" in a fixed reference frame regardless of the position and orientation of the 6 DOF sensor used with the training unit (described below), i.e., regardless of the 6 DOF instrument reference frame. The 3D module 66 is used by the data collection and verification modules 70 and 72 for positioning and aligning the volume of data.

The 3D module 66 receives initial coordinates from the 6 DOF module and outputs a set of modified coordinates after selected transformations have been conducted.

In order for the 3D module 66 to define a new reference frame coordinate system, it takes a set of 6 DOF data at a desired point (labeled as a "first point") from the 6 DOF unit 28 and saves it. The desired point will be the origin in the new reference frame. All later 6 DOF coordinates are then transformed to 6 DOF coordinates in this reference frame, i.e., with respect to the "first point."

The 3D module 66 performs a volume positioning step which enables the user to position the recorded volume of ultrasound data in the correct position and orientation as it was originally in the patient's body. The "first point" is saved and regarded as the origin of the axis in the new reference frame. A second set of 6 DOF coordinates (labeled as a "second point") are then calculated showing the position and orientation of the volume in the new reference frame.

The position of the volume in the new reference is found as follows. The coordinate values of the "second point" are subtracted from the "first point", i.e., $X_{new}=X_{second}-X_{first}$, $Y_{new}=Y_{second}-Y_{first}$, and $Z_{new}=Z_{second}-Z_{first}$. The resulting vector is then rotated with the Euler angles of the "first point," $roll_{first}$, $yaw_{first}$, and $pitch_{first}$. This operation is the equivalent of shifting the origin of the 6 DOF sensor reference frame axis to the origin of the new reference frame and rotating the "second point" according to the angles taken in the origin.

Analogous treatment is used to find the true orientation of the volume: initial volume orientation is defined to be straight down, i.e., collinear with the axis at the origin ("first point"). To find the volume orientation, the volume is rotated in the "positive" direction according to the Euler angles of the "second point" and then rotated in the "negative" direction according to the Euler angles of the "first point." A rotation means rotating each point of the volume in the correct order: roll, yaw, and pitch, i.e. multiplication of each vector of the volume corner with the three rotation matrixes in the right order. The multiplication of the three matrixes with the vector is reduced to a single vector matrix multiplication. Rotation in the "negative" direction means multiplying the vector with the inverse matrix. After the orientation is determined, the position vector is attached to the rotated volume. The display is the true position and orientation of the volume in the patient body.

The alignment step enables the user to define the new reference frame to be collinear with the volume box. The procedure is similar to the procedure in the volume positioning step. The "first point" i.e. the origin is now chosen to be the lower left corner of the volume when viewed from top. All the rest of the 6 DOF data is used to transform the slice's coordinates that were defined in the data collection module with respect to the new origin in the same manner as defined above in the volume positioning step.

The record module 68 implements a mechanism to record the orientation of the 6 DOF receiver 26 upon demand. This recorded data is saved on the disc, and after that on a CD ROM 88, and can be read later to run the playback module 100 in the simulated ultrasound unit software 90, e.g., in a playback or Expert Scan mode.

The record module 68 also saves successive 6 DOF data and voice data, on disk and after that on the CD ROM 88, corresponding to an original ultrasound examination by an expert. The voice data can include a verbal explanation of the original operation by an expert, answers to questions about the background of the patient, and other instructional data.

In a playback mode, the recorded 6 DOF data is used to find the slice coordinates according to which the 2D slice from the volume data will be displayed. The true position and orientation of the ultrasound probe is shown to the user by implementing the transformations mentioned in the 3D Module. During playback, the stored voice data may also be heard as an explanation of the operation.

In the data collection module 70, volume data is constructed using successive ultrasound images and related 6 DOF orientation data. For each ultrasound probe position a "slice" (or rectangle) is defined which represents a window in the ultrasound image. The coordinates of the slices are calculated according to the 6 DOF of the initial and current data. This is done in the same manner set forth in the description of the 3D module. It is assumed that the initial position of the ultrasound probe 26 is in the bottom left corner of the volume box when viewed from the top.

The data collection module 70 accepts 6 DOF orientation data taken through the 6 DOF module 62 and ultrasound display data taken via the video card module 64. The data collection module 70 issues commands to the video card 54 and to the 6 DOF unit 28, and prepares volume data for the training unit 20. It extends Bresenham's 2D algorithm to a 3D incremental line algorithm to form straight lines, as discussed in the description of the simulated ultrasound unit 40 below, and calculates the distances between each pixel in the ultrasound window. The operability of Bresenham's 2D algorithm can be seen in Chapter 2—Point Plotting Techniques, Subchapter 2.3—Line Drawing Algorithms of William P. Newman and Robert F. Sproull, "Principles of Interactive Computer Graphics" (2nd ed. McGraw Hill). An extension of this algorithm to three dimensions would be obvious to one skilled in the art. The distance between each pixel in the ultrasound window is reflected in the volume voxels when a jump occurs from one pixel to its neighbor in the same row and when a jump occurs from one pixel to its neighbor in the same column.

The positions of all pixels in the slice are checked, and if any of them are inside the stored volume, the appropriate volume voxel is filled with the data taken from the video card 54 via the video card module 64. Each voxel that is filled is then counted and the percentage of the filled volume is calculated. When all voxels have been filled, the data collection module 70 acts as a means for determining when a complete set of biological data has been gathered from the living body, and sends a message to the operator indicating that the volume has been filled.

The data verification module 72 extracts preset ultrasound images from the volume data. The operation of this module is identical to the operation of the data collection module 70 but in the reverse order, i.e., it gets 6 DOF data and volume data, calculates the slice coordinates, and sends information to the display module 76 for displaying 2D slices extracted from the volume data.

The display module 76 handles all DRU displays, accepting display data from the data verification module 72 and sending it to a display monitor (not shown).

A suitable host computer for the preferred embodiment of the DRU computer 30 is the Indy R4400SC running at 150 MHz with 256M RAM, a built in video sub-system, and an SCSI CD ROM drive. A suitable 6 DOF unit for use as 6 DOF unit 28 is the Polhemus 3SPACE FASTRAK, manufactured by the Polhemus Corp. of Colchester, Vt. The 6 DOF unit 28 connects to the host computer via a RS-232 interface.

In accordance with the invention, a reproduction unit 20 accepts biological display data and uses this data to reproduce the operation of an ultrasound unit.

As broadly depicted in FIG. 1, a simulated body 32 is provided, preferably a mannequin, the simulated body 32 including a transmitter 34, as discussed in further detail below. The a transmitter 34 can be embedded in the body at any of a plurality of desired locations, or can be attached outside of the body at any of a plurality of locations. It is to be understood, however, that the simulated body 32 is necessary only when the invention is used for training. When used by a trained practitioner for diagnosis, the transmitter 34 alone is necessary, without requiring a simulated body.

In accordance with the invention, a sensor is operable to detect data in relation to a position of the sensor with respect to the transmitter. As is broadly depicted in FIG. 1, a simulated ultrasound probe 36 is provided, containing a sensor connected via cable 38 to a simulated ultrasound unit 40. The probe 36 is configured to be held by an operator/trainee, and be manipulated with six degrees of freedom exactly the same as the actual ultrasound probe 26. The probe 36 includes as the sensor a 6 DOF receiver 46, depicted broadly in FIG. 4.

The 6 DOF receiver 46 can be a single assembly of three co-located remote sensing antennae, tuned to receive signals from a 6 DOF transmitter 34 positioned in the simulated body 32. The 6 DOF transmitter 34 can be a single assembly of three co-located stationary antennae which generate near field, low frequency, magnetic field vectors. The 6 DOF receiver 46 and the 6 DOF transmitter 34 are not limited to this embodiment, however, and may be any kind of receiver and transmitter that can detect six degrees of freedom. When a transmitter/receiver pair that operate on magnetic principals are used, it is preferable that the simulated ultrasound probe 36 be made of a nonmetal, e.g. wood or plastic, in order to avoid interfering with the transmitter/receiver.

The signals received by the 6 DOF receiver 46 in probe 36 comprise position data, which correspond broadly to the various positions around the transmitter 34 in the simulated body 32 of the probe 36. It will be understood that the transmitter/receiver pair can be modified to permit training on invasive or endo examination of the simulated body 32, by providing position data inside of the simulated body 32. In other words, the 6 DOF transmitter 34 and the 6 DOF receiver 46 enable the system to always know the exact position of the hand-held probe 36 with respect to the transmitter and/or the simulated body scanned by the operator/trainee.

In accordance with the invention, a processor determines a portion of the stored biological display data reproducing an examination of the living body 24 corresponding to the position data detected by the 6 DOF receiver 46 in probe 36, as broadly embodied herein.

Figure 4:
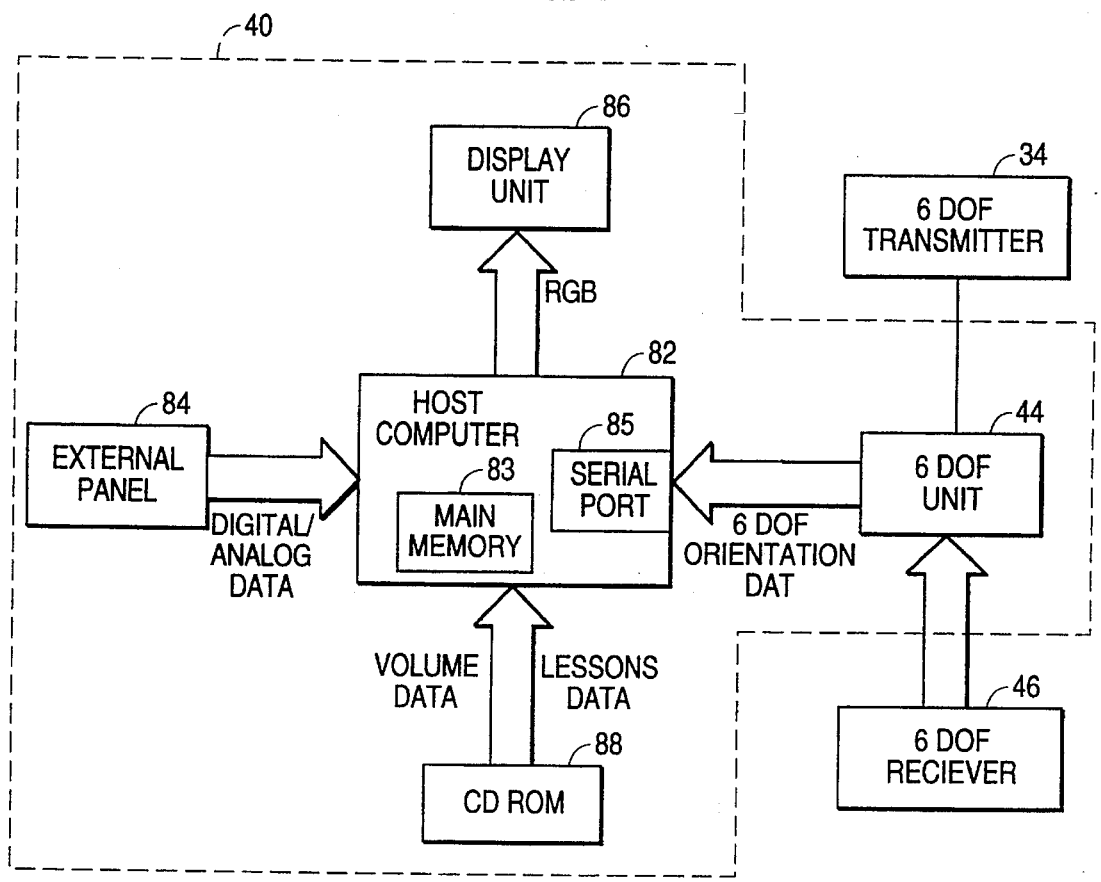
FIG. 4 is a general block diagram of the hardware elements of a reproduction unit in accordance with the invention.

As broadly depicted in FIG. 4, a preferred embodiment of the simulated ultrasound unit 40 includes a host computer 82 having a main memory 83 and a serial port 85, connected to an external panel 84, a display unit 86, a CD ROM 88, and a 6 DOF unit 44. The host computer 82 receives digital and analog control data from the external panel 84, lesson data and volume data from the CD ROM 88, and 6 DOF data from the 6 DOF unit 44.

The 6 DOF unit 44 provides instructions to the 6 DOF transmitter 34 and receives data from the 6 DOF receiver 46. The 6 DOF unit 44 processes this data to determine the 6 DOF orientation data corresponding to the position of the 6 DOF receiver 46 in the probe 36 with respect to the transmitter 34 in the simulated body 32. The 6 DOF orientation data enters the host computer through the serial port 85 from the 6 DOF unit 44.

The host computer 82 outputs display data to the display unit 86. This display data can include 2D ultrasound displays extracted from the volume data based on the 6 DOF orientation data, a display designed to aid the operator in orienting the simulated ultrasound probe 36, expert scan lessons extracted from the lessons data, and other instruction data.

In the preferred embodiment, the external panel 84 serves as a means for designating additional manipulations of the biological display data. The operator can use the external panel 84 to designate that the display should be modified according to any of a number of allowable manipulations.

Figure 5:
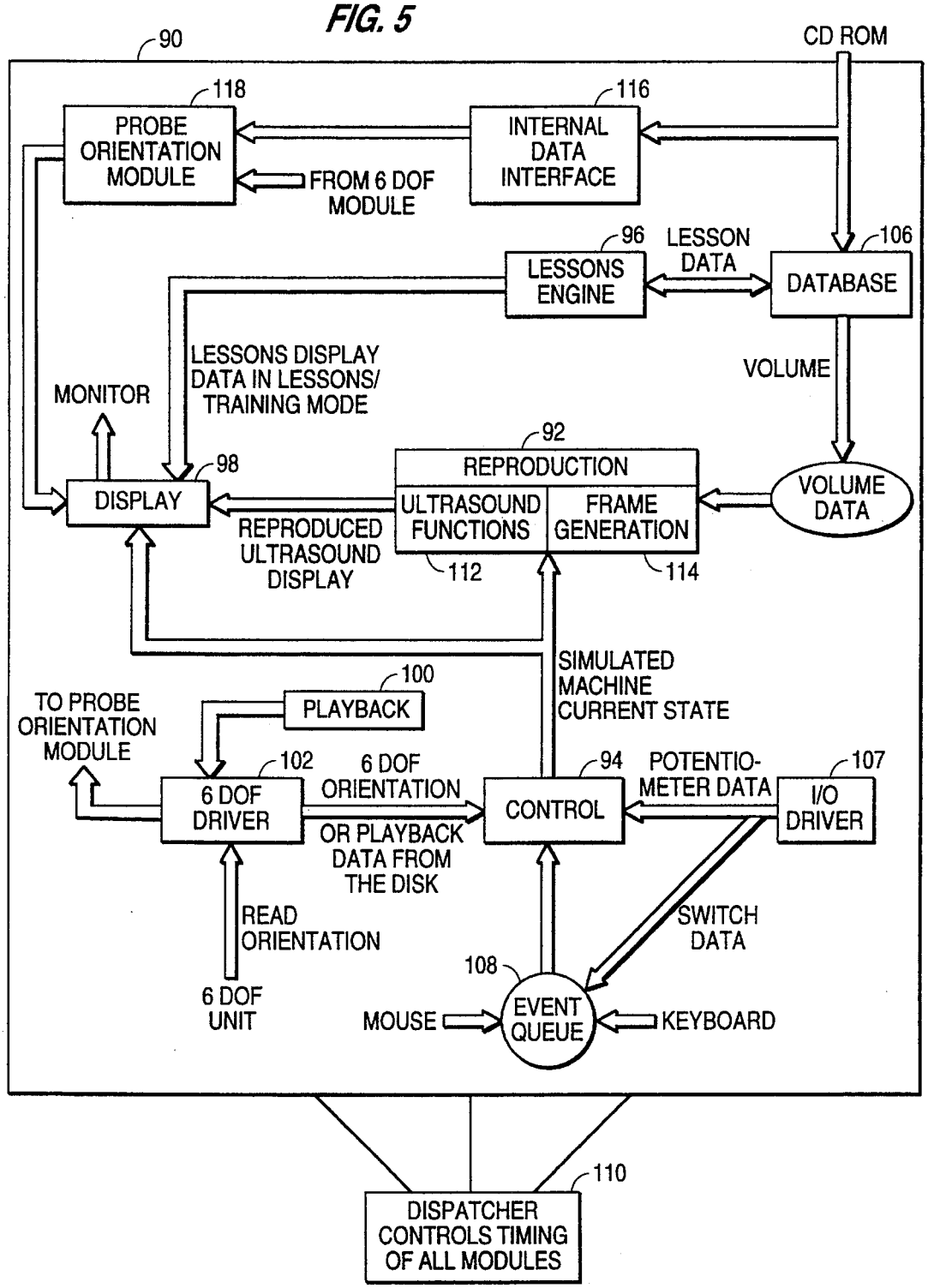
FIG. 5 is a general block diagram of the ultrasound reproduction software elements in accordance with the invention.

As broadly shown in FIG. 5, a preferred embodiment of the host computer 82 contains a control program 90 for controlling the operation of the ultrasound reproduction unit 20. The control program 90 includes a reproduction module 92, a control module 94, a lessons module 96, a display module 98, a playback module 100, a 6 DOF module 102, an I/O module 104, a data base 106, an event queue 108, a dispatcher module 110, an internal data structure 116, and a probe orientation module 118.

In the preferred embodiment, the reproduction module 92 serves as a means for designating additional manipulations of the biological display data, such as B-gain, doppler (D)-gain, flow (F)-gain, motion (M)-gain, annotations, body marks, print and record, caliper and measurement, freeze, cinemode, transducer type selection, audio volume, acoustic power, image direction, magnification zoom, image focus and color doppler. The reproduction module 92 handles the reproduction part of the ultrasound reproduction unit and comprises at least two submodules: the frame generator submodule 114 and the ultrasound functions simulations submodule 112. The frame generator submodule 114 generates the ultrasound frames in real-time at the required refresh rate, e.g., 10–20 Hz. The ultrasound functions simulation submodule 112 simulates real ultrasound functions such as gain, time gain control (TGC) and expand.

Figure 6:
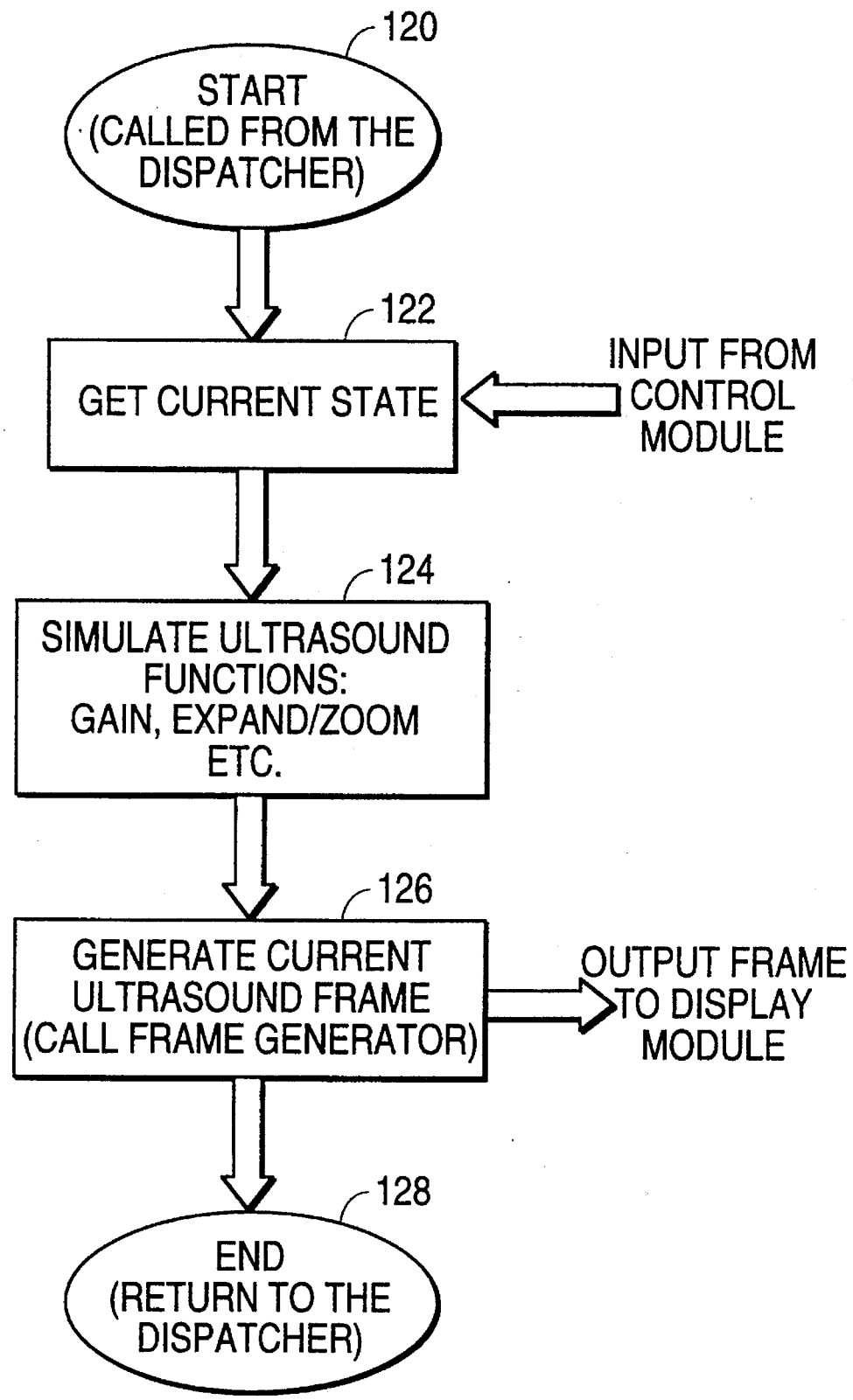
FIG. 6 is a flow chart depicting a reproduction module for handling a reproduced ultrasound subsystem, receiving inputs from a control module, and generating an ultrasound image for transfer to a display module in accordance with the invention.

The general operation of a preferred embodiment of the reproduction module 92 is shown broadly in FIG. 6. During operation the dispatcher 110 first calls the reproduction module 92 (Step 120). The reproduction module 92 then gets the current state of the ultrasound trainer from the control module 94 (Step 122). The reproduction module 92 next simulates real ultrasound functions through the ultrasound functions simulation submodule 112 (Step 124). The reproduction module 92 then generates the current ultrasound frame through the frame generator submodule 114 and outputs the frame to the display module 98 (Step 126). Finally, the reproduction module 92 returns control to the dispatcher 110 (Step 128).

Figure 7:
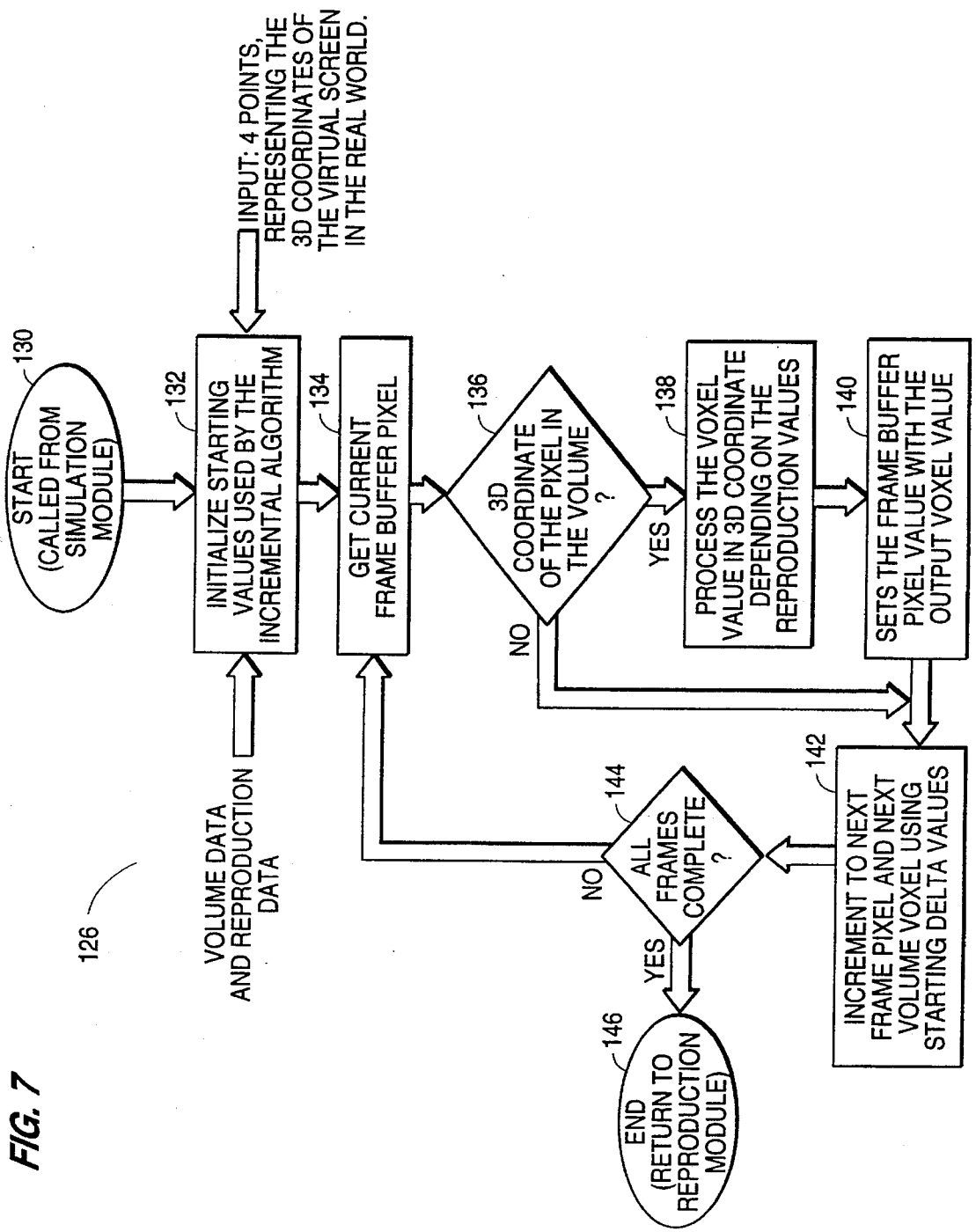
FIG. 7 is a flow chart depicting a frame generator submodule receiving 3D coordinates and selecting data to be displayed in accordance with the invention.

The operation of a preferred embodiment of the frame generator submodule 114 is shown broadly in FIG. 7. The object of the frame generator submodule 114 is to maintain a plane in a 3D coordinate system that represents the orientation of the simulated ultrasound probe in the real world.

The frame generator submodule 114 accepts as inputs the volume data, as a 3D array of bytes, that was collected previously by the DRU computer 30 and the 6 DOF orientation data received from the 6 DOF unit 44. Every byte in the volume represents a piece of data called a voxel. The depth of the data produced by a standard ultrasound machine is 8 bits, therefore the simulated ultrasound unit 40 will contain 8 bits of data for each voxel.

The current position of the 6 DOF receiver 46 in the simulated ultrasound probe 36 with respect to the volume in memory 32, as shown by the 6 DOF orientation data, determines which voxels from the volume fall on the current probe plane and should therefore be displayed on the screen.

The frame generator 114 maintains a plane in a 3D coordinate system which represents the orientation of the simulated ultrasound probe in the real world. This plane is a virtual frame buffer which can be described as pixels of a 2D matrix which is the size of the ultrasound frame. This plane cuts the volume of data and therefore contains the voxels attributed to that plane. The voxels which fall on the plane are the ones which will be displayed on the display of the simulated ultrasound unit 40.

As broadly shown in FIG. 7, the operation of the frame generator submodule 114 is as follows. The reproduction module 92 first calls the frame generator 114 (Step 130), which begins by initializing the starting values for its algorithms (Step 132). The frame generator 114 then gets the current frame buffer pixel (Step 134) and determines if the pixel is within the available volume for which there is volume data (Step 136). If the voxel is within the available volume, the frame generator 114 processes the voxel value in 3 dimensional coordinates, depending upon the reproduction values (Step 138), and sets the frame buffer pixel value with the output voxel value (Step 140). Then, whether the coordinate was within the available volume or not, the frame generator 114 increments to the next frame pixel and volume voxel using the starting delta values (Step 142). Finally, the frame generator 114 will determine if the frame is complete (Step 144). If it is complete, the frame generator 114 will return control to the reproduction module 92 (Step 146). If they are not complete, the frame generator 114 will get the next frame buffer pixel (Step 134).

FIG. 10 broadly shows the operation of this method in graphical form. The method for constructing such a frame in a real time is an expansion of Bresenham's 2D line algorithm to a 3D incremental line algorithm. Using this method all pixels are looped on the virtual frame buffer and the next voxel which falls on the current pixel is incrementally calculated. The algorithm starts by calculating the initial values needed to increment the 3D point which is the current voxel. All pixels in the frame buffer are next determined, starting at P1 over the line between P1 and P2 by the 3D Line algorithm. Pixels in the next incremental line are determined by performing a 3D line algorithm between P1 and P3 (P2 and P4) and so on. At the end of the algorithm all the pixels contain the needed values. If a pixel falls outside the volume it receives a value of 0, or some other value indicating that it is outside the volume. The frame generator 114 outputs a 2D array of bytes, which is contained in an ultrasound frame buffer (not shown), to the display module 98. If all of the pixels are outside the volume, the frame generator 114 instructs the display module to display a blank screen.

Preferably, the ultrasound functions simulation submodule 112 simulates ultrasound functions such as gain control, freeze, zoom and expand. The submodule implements image processing techniques on the ultrasound volume data in a method which is similar to the processing method on actual ultrasound machines. It accepts as inputs the current state of the training unit and the volume voxels, and outputs a set of modified volume data.

The ultrasound functions simulation submodule 112 processes each voxel that falls on the probe plane and determines the value of the voxel after simulating gain control, freeze, etc. and determines the position of that voxel on the current image depending on the expanded status by scaling the image around a fixed point. For each voxel, the output of the ultrasound functions simulation submodule 112 is a current value of the voxel depending on the image processing of the voxel due to the simulated ultrasound function.

In the preferred embodiment, a probe orientation module 118 sends instructions to the display module 98 to display a probe orientation display on the display unit 86. This probe orientation display includes a representation of the area of the patient reproduced by the volume data, along with a representation of the scanning plane corresponding to the reproduced ultrasound scan. Both of these representations are superimposed on a three dimensional image of a virtual patient to assist the operator in properly orienting the simulated ultrasound probe 36.

Figure 11:
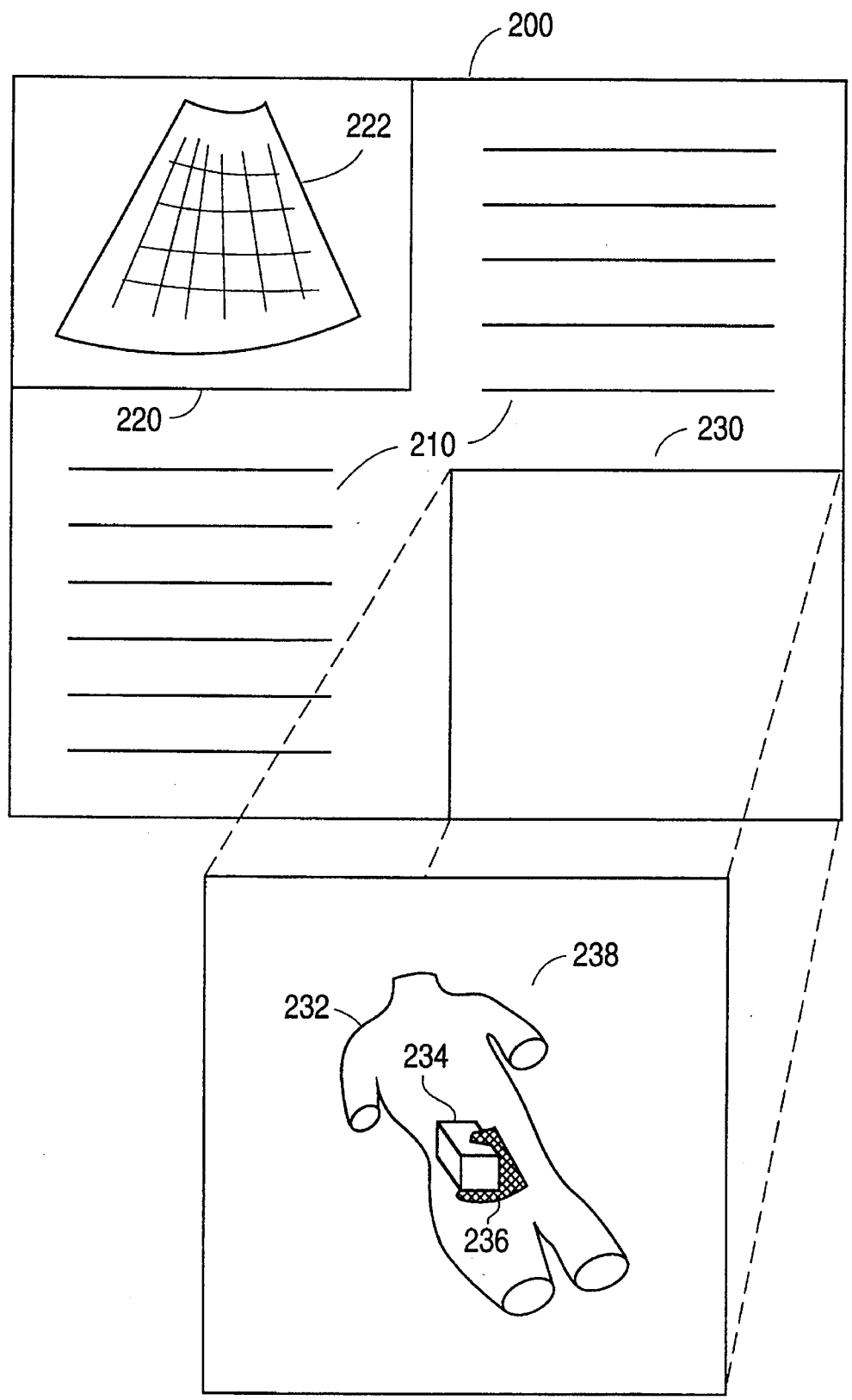
FIG. 11 depicts a display screen used with the present invention, including a probe orientation display.

FIG. 11 shows a preferred embodiment of a reproduced ultrasound display 200 with a probe orientation display 238. The reproduced ultrasound display screen 200 includes a function window 210, a reproduced ultrasound display window 220, and a probe orientation display window 230. The function window includes a list of functions that may be chosen, such as simulated ultrasound functions or lesson functions. The reproduced ultrasound display window 220 includes a reproduced ultrasound display 222. The probe orientation display window 230 includes a probe orientation display 238 including a volume box 234 and a scanning plane 236 superimposed on a picture of a virtual patient 232. The volume box 234 is a representation of the part of the virtual patient 232 corresponding to the volume data. The scanning plane 235 is a representation of the area in the virtual patient 232 of the reproduced ultrasound scan.

The reproduced ultrasound display 200 is not limited, however, to the use of the probe orientation display 238 in the probe orientation display window 230. This invention contemplates the use of any kind of display that would assist the operator of the simulated ultrasound unit 40 in orienting the simulated ultrasound probe 36.

Figure 12:
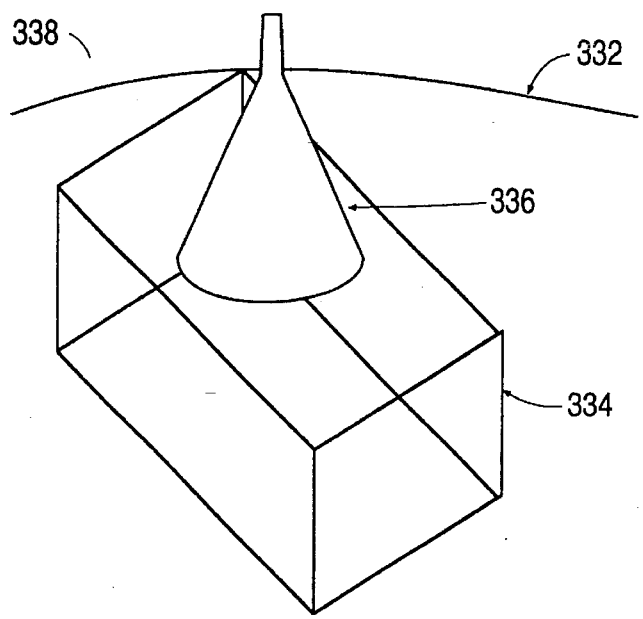
FIG. 12 depicts an alternate probe orientation display that may be used with the present invention.

FIG. 12 shows an example of an alternate embodiment of the probe orientation display. The alternate probe orientation display 338 includes a volume box 334, a scanning plane 336, and a boundary line 332. The volume box 334 and the scanning plane 336 are similar to the volume box 234 and the scanning plane 234 in the previous embodiment of the probe orientation display. The boundary line 332 serves as an indicator of location of the outside surface of a virtual patient with respect to the location of the volume box 334. In this alternate embodiment, the size of the volume box 334 is increased and the volume box 334 is made transparent or semi-transparent to make it easier to observe the location of the scanning plane 336.

Figure 13:
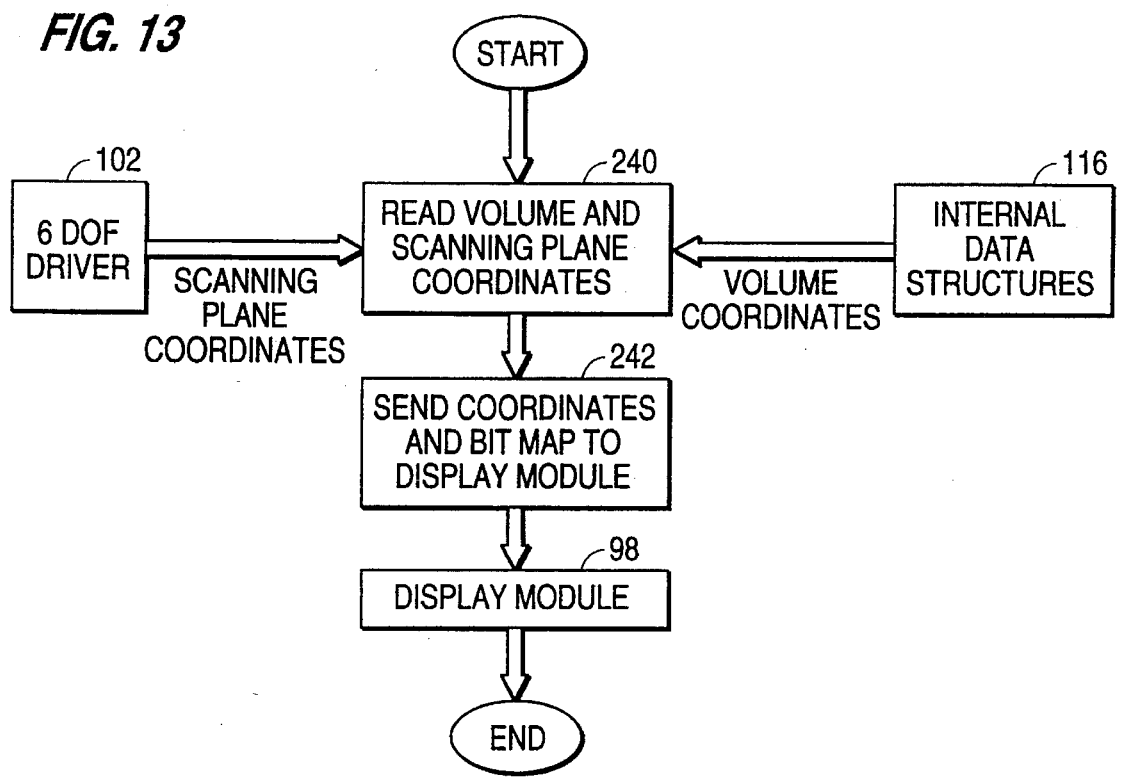
FIG. 13 is a general block diagram of the operation of the probe orientation module.

The operation of a preferred embodiment of the probe orientation module 118 is shown broadly in FIG. 13. The object of the probe orientation module is to instruct the display module 98 to display the probe orientation display 238.

The probe orientation module 118 begins operation by accepting scanning plane coordinates from the 6 DOF driver 102 and volume coordinates from the internal data structure 116 (Step 240). The internal data structure 116 contains information received from the CD ROM 88 regarding the location of the volume box 234 in the virtual patient 232. The probe orientation module 118 then instructs the display module 98 to place a bit map of the 3D representation of the virtual patient 232 in the probe orientation display window 230 (Step 242). Finally the probe orientation module 118 instructs the display module 98 to draw a volume box 234 and a scanning plane 236 superimposed onto the representation of the virtual patient 232 based on the scanning plane coordinates and the volume coordinates received in Step 240. The display module 93 performs this step using a Z buffer algorithm, in order to perform hidden surface removal.

The control module 94 handles the state of the simulated ultrasound unit 40 as a function of external events, e.g., manipulation of a mouse, keyboard, or the like, which may be part of the external panel 84. The module handles the external events via a state machine, such as the one broadly shown in FIG. 8.

The control module 94 accepts digital and analog inputs from the external panel as well as the current 6 DOF orientation information from the 6 DOF driver 102. In the preferred embodiment the digital inputs are saved, whenever they occur, by an interrupt handler in an event queue. The control module 94 reads the event queue 108 when called by the dispatcher 110. In the preferred embodiment the analog inputs include such signals as M Gain, B Gain and output power. The current 6 DOF orientation data comes in the form of 6 dimensional data, i.e., 3 position coordinates and 3 angles.

The inputs to the control module 94 from the 6 DOF module 102 are read from the hardware or, if the system is in playback mode, from the playback module 100, which reflects the inputs as they were recorded previously.

Figure 8:
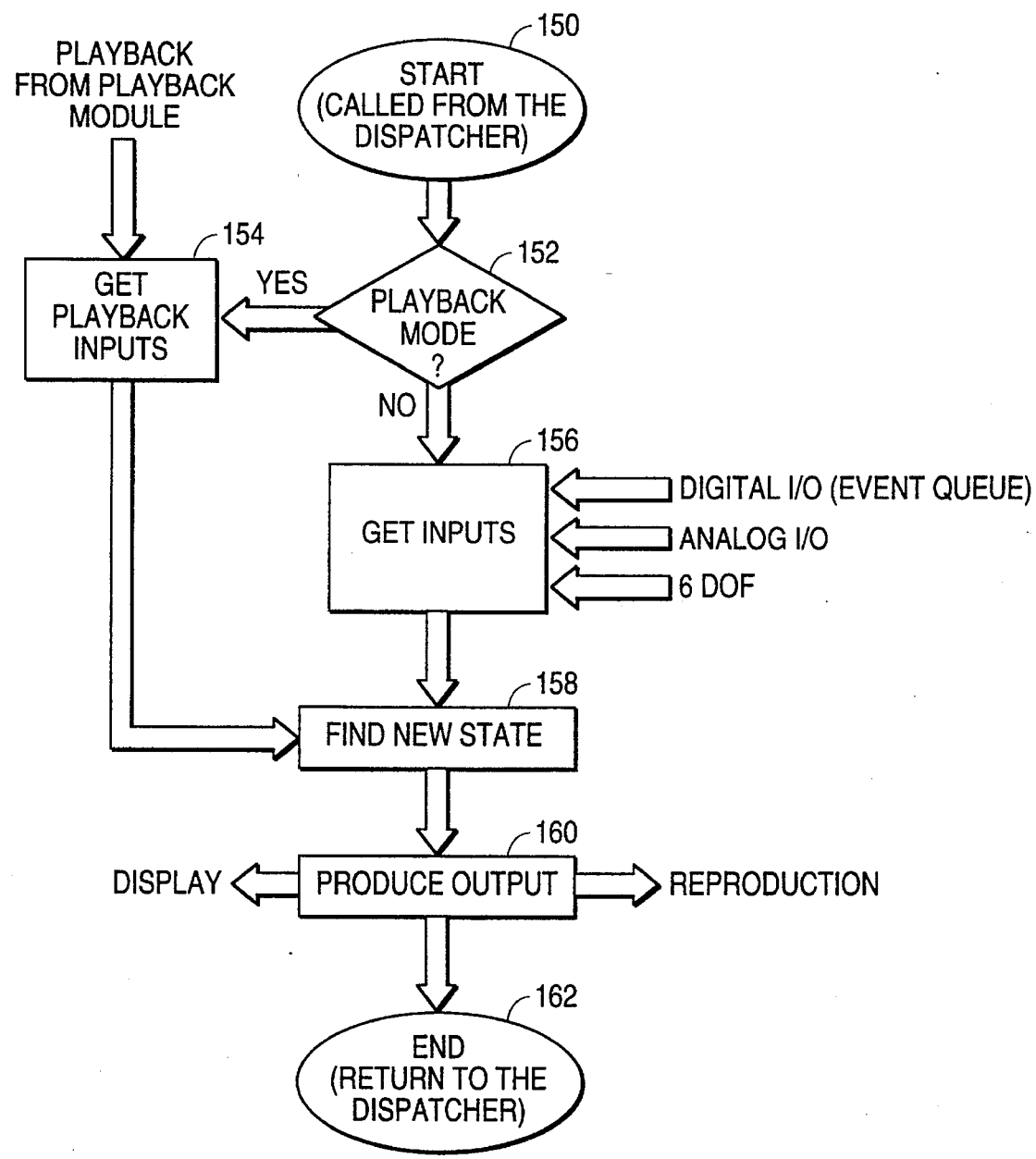
FIG. 8 is a flow chart of a control module implementing a state machine of a reproduced ultrasound in accordance with the invention.

In a preferred method of operation, as shown broadly in FIG. 8, the control module 94 is called by the dispatcher 110 every 100 ms (Step 150). Whenever the control module 94 is called, it first examines the current state of the state machine to determine if it is in playback mode or training mode (Step 152). It then reads the inputs from the hardware or from the playback module (Step 154 or 156), and, based on the state of the state machine and the inputs, determines a new state (Step 158), produces the required outputs (Step 160) and returns the control to the dispatcher (Step 162).

The dispatcher module 110 determines the timing for running all the other modules of the simulated ultrasound unit 40. This timing must be precise and must be done according to the specific mode of operation. The dispatcher module 110 accesses a table stored in a special table file in the main memory 83 which defines the timing and the modes for each module in the simulated ultrasound unit 40.

The dispatcher module 110 divides the time of operation into intervals, e.g., of about 1 second, and then further divides each interval into a plurality of slots, e.g., 20 slots of 50 ms each. The dispatcher module 110 runs the time intervals in an endless loop, and schedules several modules for each time slot, according to the predefined table. A module can be scheduled in one or more slots according to the required frequency of operation. The duration of the time slot sets the upper limit of the frequency, while the length of the time interval sets the lower limit.

Figure 9:
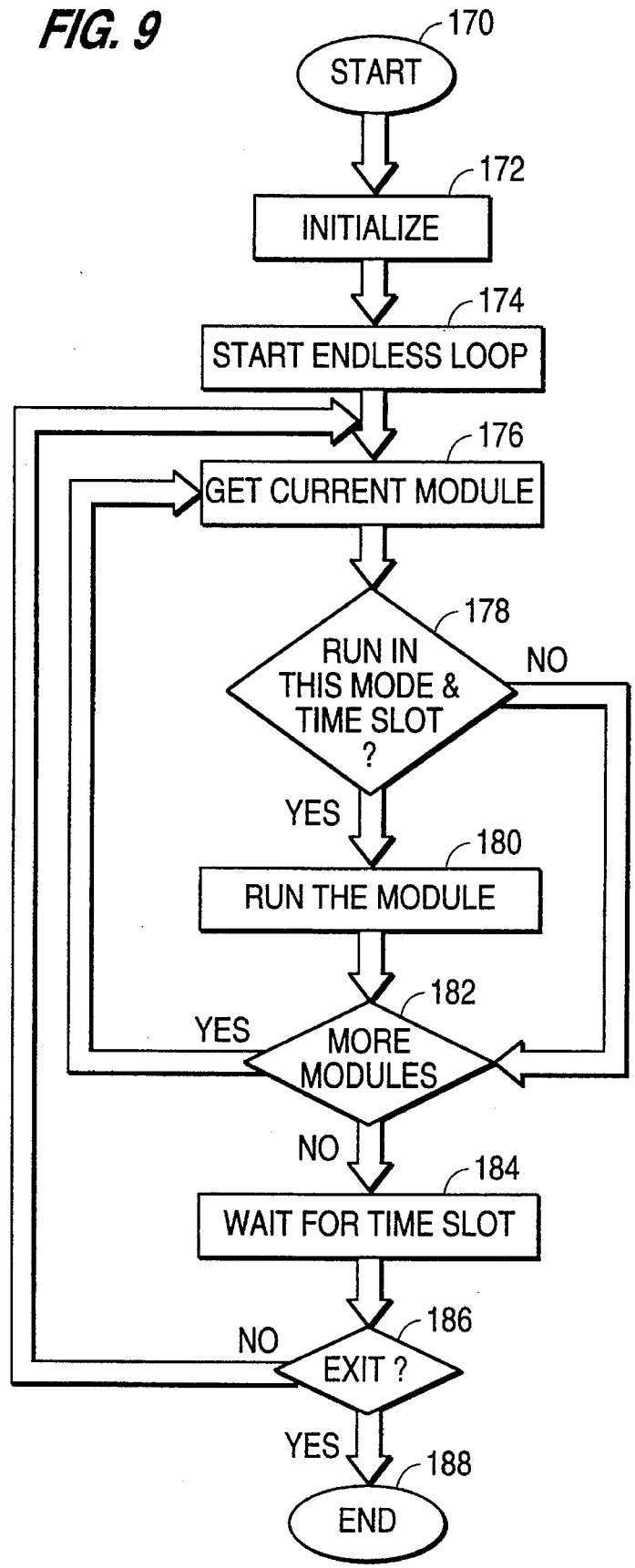
FIG. 9 is a flow chart of a dispatcher in accordance with the invention.

The operation of the dispatcher module 110 is shown broadly in FIG. 9. After operation of the dispatcher 110 starts (Step 170), the dispatcher 110 initializes itself (Step 172) and begins its endless timing loop (Step 174). In the endless loop, the dispatcher 110 gets the current module (Step 176), determines if the module should be run in a given time slot (Step 178), and runs the module if necessary (Step 180). If there are no remaining modules for a particular time slot the dispatcher will wait for the next time slot (Step 184) before again getting the current module (Step 176). The dispatcher will continue in the endless loop until it receives the command to exit (Step 186) at which point the operation of the dispatcher will end (Step 188).

In the preferred embodiment, the playback module 100 operates as a means for determining the biological display data corresponding to a previous examination stored in the memory unit 84. The playback module 100 works when the system is in playback mode, playing back the Expert Scan as recorded on the DRU computer 30. It replaces the inputs received from the hardware and provides these inputs from a playback file.

When the system is in playback mode, the dispatcher module 110 handles timing through the use of a virtual time. The virtual time can be moved forward, stopped or played back according to the instructions from the dispatcher module 110. When the playback module 100 gets the current virtual time, it finds the entry in the playback data according to this time point, and reads the relevant playback data. This playback data is read from the data received from the DRU computer 30 when the Expert Scan was recorded.

The 6 DOF module 102 is an interface with the 6 DOF hardware. It performs the functions of reading and writing from or to the 6 DOF hardware. In the preferred embodiment, this module is called from the dispatcher module 110 every 100 ms and it loads to the data structure the current 6 DOF orientation data received from the 6 DOF sensor in the simulated ultrasound probe 36.

The 6 DOF module 102 performs a read or write function from or to the 6 DOF hardware via the serial port 85. These read and write functions are used by other modules in order to interface with the 6 DOF hardware.

The data base module 106 performs regular data base manipulations. For example, it enables the system to read the ultrasound volume data into the main memory, where the ultrasound volume data is a 3D array which is compressed on the CD ROM 88. It also reads the lessons data from the CD ROM 88. The functions of the data base module 106 are used primarily during initialization of the simulated ultrasound unit 40.

When the data base module 106 is accessed it receives as an input the name of a requested lesson. The data corresponding to the requested lesson includes a set of the volume data associated with that lesson. The data base module 106 decompresses the volume data and loads it into the main memory 83. The data base module 106 then reads the lesson data associated with the desired lesson from CD ROM 88 and loads it into the main memory 83 in the form of a data structure. Then, as necessary for the operation of the simulated ultrasound unit 40, the data base module 106 outputs the data from the data structure.

The display module 98 uses graphic library routines in order to form both a display on the simulated ultrasound unit's main display 86 and any other required graphic symbols. In the preferred embodiment, the dispatcher calls the display module 98 every 100 ms. The display module 98 outputs the current display screen based on the current state of the reproduction unit.

The lessons module 96 performs all of the tutorial interactive functions, such as tests and patient interviews. It performs this function based on the lessons related to the current session stored in the main memory 83. The lessons module 96 also performs user friendly interactive sessions with trainee, including using menus, graphics, sound and video. The lessons module 96 is called when the user activates it from the user interface and it runs until the user exits the program.

A suitable host computer 82 for the preferred embodiment of the simulated ultrasound unit 40 is the Pentium 90 MHz 512M RAM, with a video board and including an SCSI CD ROM drive. A suitable 6 DOF unit 44 for use with the simulated ultrasound unit 40 is the 3SPACE ISOTRAK, also manufactured by the Polhemus Corp. The ISOTRAK model generally is less accurate them the FASTRAK. As embodied herein, it is preferred to use a more accurate unit for data collection than for training. 6 DOF unit 44 connects to the host computer via a RS-232 interface.

The display unit 86 in the simulated ultrasound unit 40 allows the operator of the simulated ultrasound unit to view the ultrasound display corresponding to a given ultrasound scan. This display shows the ultrasound image that would be seen if a real living body were scanned using an actual ultrasound unit. As with a standard ultrasound scan, the operator can manipulate the displayed data in certain ways, e.g., freezing the display, magnifying parts of the display, displaying multiple images, controlling the time gain, etc. As an alternative to a reproduced display based on a practice scan, the operator can view an expert scan which shows the ultrasound display corresponding to an ultrasound scan performed by an expert.

The preferred embodiment described above presents the invention in the form of an ultrasound trainer and diagnostic device. However, the broad principles of the invention can apply to other medical trainers and diagnostic devices as well. For example, it is envisioned that the embodiment of the invention could be modified to train operators or provide diagnostic capability in such procedures as laparoscopy, hysteroscopy, and colonoscopy, or the like, while still falling within the scope of the invention.

The foregoing description of the preferred embodiment of the invention has been presented for purposes of illustration and description. It is not intended to be exhaustive or to limit the invention to the precise form disclosed. Modifications and variations are possible in light of the above teachings, or may be acquired by practice of the invention. The embodiment was chosen and described in order to explain the principle of the invention and its practical application to enable one skilled in the art to utilize the invention and various embodiments and modifications directed to the particular use. The scope of the invention is defined by the claims and their equivalents.

What is claimed is:

1. An ultrasound training system, comprising:
   a memory unit storing ultrasound biological display data previously gathered from a living body examined with an ultrasound machine;
   a transmitter;
   a sensor housed in a simulated ultrasound probe operable to detect position data corresponding to a position of the sensor with respect to the transmitter;
   a processor for selecting a portion of the stored previously-gathered ultrasound biological display data reproducing an examination of the living body corresponding to the position data detected by the sensor; and
   a display unit operable to display an output corresponding to the portion of the previously-gathered ultrasound biological display data selected by the processor.

2. The ultrasound training system of claim 1, wherein the display unit is further operable to display both a virtual patient including an indication of a portion of the virtual patient corresponding to the previously-gathered ultrasound biological display data, and a representation of the position data detected by the sensor.

3. An ultrasound training system, comprising:
   a memory unit storing ultrasound biological display data previously gathered from a living body examined with an ultrasound machine;
   a transmitter attached to a simulated body;
   a sensor housed in a simulated ultrasound probe operable to detect position data corresponding to a position of the sensor with respect to the transmitter attached to the simulated body;
   a processor for selecting a portion of the previously-gathered ultrasound biological display data reproducing an examination of the living body corresponding to the position data detected by the sensor; and
   a display unit operable to display an output corresponding to the portion of the previously-gathered ultrasound biological display data selected by the processor.

4. The ultrasound training system of claim 3, wherein the position data detected by the sensor includes a position of the sensor in six degrees of freedom with respect to the simulated body.

5. The ultrasound training system of claim 3, wherein the simulated body is a mannequin.

6. The ultrasound training system of claim 3, wherein the memory unit stores a plurality of sets of previously-gathered ultrasound biological display data corresponding to a plurality of living bodies examined with an ultrasound machine, and
   further comprising a means for selecting one of the plurality of sets of previously-gathered ultrasound biological display data for input into the processor.

7. The ultrasound training system of claim 3, further comprising means for designating additional manipulations of the previously-gathered ultrasound biological display data; and
   means in the processor for manipulating the previously-gathered ultrasound biological display data according to the designated additional manipulations.

8. The ultrasound training system of claim 7, wherein the means for manipulating the previously-gathered ultrasound biological display data include the ability to manipulate at least one selected from the group consisting of B mode, doppler, color doppler, M mode, gains, annotations, body marks, print and record, caliper and measurements, freeze, cinemode, transducer type selection, audio volume, acoustic power, magnification, zoom, and image focus.

9. The ultrasound training system of claim 3, further comprising a means for designating a tutorial mode, and wherein the processor further includes a means for determining the ultrasound biological display data corresponding to a previous examination stored in the memory unit.

10. The ultrasound training system of claim 3, wherein the memory unit is further operable to store additional data regarding the living body, including patient medical history, medical information, and diagnostic data, and the display unit is further operable to display the additional data.

11. The ultrasound training system of claim 3, further comprising:
    a data receiving unit operative to obtain the ultrasound biological display data gathered from the living body.

12. The ultrasound training system of claim 11, further comprising:
    means for determining when a complete set of ultrasound biological data has been gathered from the living body.

13. The ultrasound training system of claim 3, wherein the display unit is further operable to display both a virtual patient including an indication of a portion of the virtual patient corresponding to the previously-gathered ultrasound biological display data, and a representation of the position data detected by the sensor.

14. An ultrasound training system, comprising:
    a memory unit storing ultrasound display data gathered from a living body examined with an ultrasound machine;
    a transmitter attached to a simulated body;
    a simulated ultrasound probe, including a sensor operable to detect position data corresponding to a position of the probe with respect to the transmitter attached to the simulated body;
    a processor for selecting a portion of the stored previously-gathered ultrasound display data reproducing an ultrasound examination of the living body corresponding to the position data detected by the sensor; and
    a display unit operable to display an ultrasound image based on the portion of the ultrasound display data selected by the processor.

15. The ultrasound training system of claim 14, wherein the display unit is further operable to display both a virtual patient including an indication of a portion of the virtual patient corresponding to the ultrasound display data, and a representation of the position data detected by the sensor.

* * * * *